(12) United States Patent
Burts, Jr. et al.

(10) Patent No.: US 7,409,990 B1
(45) Date of Patent: Aug. 12, 2008

(54) DOWNHOLE MIXING OF ENCAPSULATED PLUG COMPONENTS FOR ABANDONING A WELL

(76) Inventors: Boyce D Burts, Jr., 101 Ravens Wood, Lafayette, LA (US) 70508; Boyce Donald Burts, III, 209 Southern Pines, Lafayette, LA (US) 70508; Freddie L. Sabins, 7007 Racquet Ct., Houston, TX (US) 77069; Larry Waters, 1006 Windsor Chase La., Spring, TX (US) 77373

( * ) Notice: Subject to any disclaimer, the term of this patent is extended or adjusted under 35 U.S.C. 154(b) by 0 days.

(21) Appl. No.: 11/162,448

(22) Filed: Sep. 9, 2005

Related U.S. Application Data

(60) Provisional application No. 60/608,255, filed on Sep. 9, 2004, provisional application No. 60/608,256, filed on Sep. 9, 2004, provisional application No. 60/608,257, filed on Sep. 9, 2004.

(51) Int. Cl.
*E21B 33/13* (2006.01)
(52) U.S. Cl. ............. 166/289; 166/285; 166/292; 166/300

(58) Field of Classification Search ............ None
See application file for complete search history.

(56) References Cited

U.S. PATENT DOCUMENTS

| | | | | |
|---|---|---|---|---|
| 5,439,318 | A * | 8/1995 | Stark | 405/129.3 |
| 6,554,071 | B1 * | 4/2003 | Reddy et al. | 166/293 |
| 6,910,537 | B2 * | 6/2005 | Brown et al. | 166/294 |
| 7,036,586 | B2 * | 5/2006 | Roddy et al. | 166/277 |

* cited by examiner

*Primary Examiner*—Jennifer H. Gay
*Assistant Examiner*—Kerry W. Leonard
(74) *Attorney, Agent, or Firm*—N. Elton Dry; J.M (Mark) Gilbreth; Mary A. Gilbreth

(57) ABSTRACT

A two part encapsulated cementing system is mixed downhole in a method of plugging an abandoned well. Using this two part system, one of the components is first placed in the well at the desired plugging depth. Next, the other component is placed in the well above the first placed component. Densities of the components have been selected such that the density of the second placed component is sufficiently higher then the density of the first placed component to facilitate gravity mixing of the two components as the second placed component moves through the first placed component and in the process activation occurs.

14 Claims, No Drawings

DOWNHOLE MIXING OF ENCAPSULATED PLUG COMPONENTS FOR ABANDONING A WELL

RELATED APPLICATION DATA

This application claims priority/benefit of U.S. Provisional Patent Application Ser. Nos. 60/608,255, 60/608,256, and 60/608,257, all filed Sep. 9, 2004, and all herein incorporated by reference.

BACKGROUND OF THE INVENTION

1. Field of the Invention

The present invention relates to wells, abandoned wells, well operations, to methods, apparatus and products for operating wells. In another aspect, the present invention relates to wells, abandoned wells, abandoning wells, to methods, apparatus and products for abandoning wells. In even another aspect, the present invention relates wells, plugged wells, plugging wells, and to methods, apparatus and products for plugging abandoned wells. In still another aspect, the present invention relates wells, treated wells, treating wells, and to methods, apparatus and products for treating abandoned wells.

2. Brief Description of the Related Art

Wells of various types after their useful lives are shut down and usually permanently plugged for a variety of reasons. For example, wells employed in the production of oil and gas are usually abandoned because they reach the end of their useful life or they become damaged beyond repair.

Various jurisdictions in the oil producing regions of certain countries require that abandoned wells be plugged to protect safety and environmental interests, for example, to protect aquifers and the above surface environment.

Wells are most commonly plugged with Portland cement, although a number of alternative materials have been proposed and are less commonly utilized. Generally, a well is plugged by pouring Portland cement into the wellbore, and curing the cement in situ.

It will be appreciated that it would be most uneconomic to attempt to completely fill the well bore with cement. Therefore, it has become widely known to inject cement into the well in such a way that only the potential producing zones are blocked off. These potential producing zones were abandoned due to the fact that they were not commercially viable; however, for ecological and liability reasons, it is necessary that these zones be plugged to stop seepage, contamination, and communication between zones. The potential producing zones may produce oil, natural gas, various forms of other hydrocarbons, salt water and natural water. It will be appreciated that in any one well bore, the potential producing zones may be widely spaced apart; some may be producing a small amount of oil, others natural gas, while others are producing water, etc.

Ordinary drilling mud fills the well bore in the regions between the cement plugs. For the cement plugs to be effective, they must be properly located at the producing zones and must extend a certain minimum distance, say 50 feet, above and below the producing zone thereby to reduce the possibility of seepage.

Formulation of Portland cement in the field is largely a product of trial and error by field personnel to meet irregularities in the cementing composition and the downhole environment. Cement quality control is difficult to achieve under such conditions. As a result, Portland cement cured in situ can exhibit cracking, shrinking, or poor adhesion to wellbore tubulars. An imperfect Portland cement plug can enable undesirable fluid flow through the wellbore via leaks along or through the cement.

It will be appreciated that the well bore is filled from top to bottom with a fluid material commonly termed "drilling mud". Thus, the regions between the various plugs in the well bore will be filled with drilling mud.

On such method for plugging an abandoned well is taught in U.S. Pat. No. 4,043,394, and while dated, is fairly descriptive of current methods, and is as follows.

1. Government approval to plug the abandoned well is obtained including the specified intervals to plug off the potential producing zones.

2. The drill pipe is lowered downwardly into the well until its lower end is somewhat below the bottom of where the first cement plug is to be located. (The position of the lowermost producing zone is known from information derived from the well logging operation).

3. The cement volume is calculated having regard to the interval or length of the cement plug to be placed across the zone or formation, the well bore diameter and the drill stem dimensions. The reason why the drill stem dimensions are of significance is that after the cement has been injected the drill stem or drill pipe must be lifted out of the cement and thus the level of the cement will drop by several feet depending on the displacement of the drill stem including the length of drill stem which is lifted out of the cement. Thus, this factor must be taken into account to ensure that the producing zone is properly plugged. In addition, an extra quantity of cement, nominally 20% above that calculated as described above, is included to provide a "safety factor".

4. Cement is then pumped down the drill pipe and exits through its lower end and then passes up the well bore to a point sufficiently high so that it will cover the zone required to be plugged as well as providing for an adequate degree of "safety factor" after the drill pipe has been lifted above the cement.

5. The drill pipe is then raised upwardly to a point above the top of the cement plug. Then, an eight hour waiting period is provided to allow the cement plug to harden sufficiently as to support at least a portion of the weight of the drill pipe. The drill pipe is then slowly lowered downwardly until it contacts the hardened cement. This procedure enables the plugging crew to determine by "feel" the exact position of the top of the cement plug. The elevation of the top of the plug is recorded and compared with the base log data to ensure that the cement plug is at the proper elevation. However, if an error has been made in calculating the volume of cement, or if some of the cement has spread into the producing zone, the plug may be too low, in which event, additional cement will have to be pumped into the drill hole and a further eight hour waiting period provided in order to allow the cement to harden and the location of the top of the plug located as described above.

6. Assuming the lowermost plug is found to be at the correct depth, the drill pipe is pulled up to a position adjacent the bottom of where the next plug is to be located and the procedure described above is repeated.

A number of patents and patent applications are directed to plugging abandoned wells, the following of which are only a small few.

U.S. Pat. No. 4,043,394, issued Aug. 23, 1977 to Campbell, discloses that in order to plug off potential producing zones in an abandoned well, cement is injected at the appropriate level in an amount estimated to be sufficient to seal off the zone. A selected portion of the cement, treated with a radioactive tracer, is injected to provide a layer of treated cement at the top of the wet cement plug and a probe or logging tool is thereafter used to locate the position of the top of the plug with the probe output being recorded graphically to provide a record of the position of the plug top.

U.S. Pat. No. 4,730,675, issued Mar. 15, 1988 to Wygant, discloses a method of plugging an abandoned well with a polymer gel, in which an abandoned well penetrating a subterranean formation is plugged using a gel comprising a high molecular weight, water-soluble carboxylate-containing polymer and a chromic carboxylate complex crosslinking agent.

U.S. Pat. No. 5,343,952, issued Sep. 6, 1994 to Cowan et al., discloses a method for preventing zonal communication or migration of fluids, in a well to be abandoned, by placement of a cement plug comprising a cementitious component, an activator and water.

U.S. Pat. No. 6,098,712, issued Aug. 8, 2000, and U.S. Pat. No. 6,750,179, issued Jun. 15, 2004, both to Burts, Jr., both disclose a well plug additive, well plug treatment fluid made therefrom, and method of plugging a well. The well plug additive includes a dry mixture of water soluble crosslinkable polymer, a crosslinking agent, and a reinforcing material of fibers and/or comminuted plant materials. The method of forming a well plug fluid includes contacting the additive with water or an aqueous solution, with a method of plugging the well further including the step of injecting the fluid into the wellbore.

U.S. Pat. No. 6,374,915 issued Apr. 23, 2002 to Andrews, discloses processes and apparatus for sealing abandoned well bores which includes includes a hopper for dispensing comminuted well bore packing material such as a bentonite clay onto an inclined screening surface which removes undesired fine materials. A chute for collecting material flowing off of the screening surface and directing the same into the well bore is generally funnel shaped. The apparatus includes an eccentric vibrating mechanism for vibrating the inclined screening surface to remove the undesired fine materials.

U.S. Pat. No. 6,715,543, issued Apr. 6, 2004 to Svindland, discloses a particulate matter plug that is placed along all or portions of a well to be permanently or temporarily abandoned, the plug being arranged to hinder/reduce fluid flow to surface. The plug consists of a mass of particulate matter composed of naturally occurring and/or synthetically produced granular matter, including gravel, sand, silt, clay and a mixture of these, and preferably of a poorly sorted mass of particulate matter. The granular particulate matter having average particle diameters included in the statistical range of variation of the mass is comprised of particles with an average particle diameter $>1/256$ millimeters, thus comprising approximately $2/3$ of all particles in the mass.

U.S. Patent Application Publication No. 2004/0020651, published Feb. 5, 2004, by Burts, III, discloses a well plug additive, well plug treatment fluid made therefrom, and method of plugging a well. For well plug treatment to plug an abandoned well, the well plug additive includes a dry mixture of water soluble crosslinkable polymer, a crosslinking agent, and filter aid, and optionally, a reinforcing material preferably of fibers and/or comminuted plant materials. The method of forming a well plug fluid includes contacting the additive with water or an aqueous solution, with a method of plugging the well further including the step of injecting the fluid into the wellbore.

U.S. Pat. No. 6,767,398, issued Jul. 27, 2004 to Trato, discloses cementitious compositions and cementitious slurries for permanently plugging abandoned wells and processes and methods therefor. A dry cementitious composition which when slurried with water produces an economical hydraulic cementitious slurry for closing abandoned wells. The dry cementitious composition is a cement/CKD blend as the major component with a weight ratio of parts cement to parts of CKD between about 2/3 and about 3/1. Hydraulic cementitious slurries when cured can produce hard cementitious bodies which will meet or exceed the API specification for a competent hard plug. A process for blending the cement and CKD during transit from the cement source to the off-load site without requiring further blending after off-loading. Methods are provided for determining the formulation having the cheapest cost per unit volume of hydraulic cementitious slurry thereby enabling competitive quotes based on cf of hydraulic cementitious slurry required.

In spite of the advances in the prior art, conventional cement systems suffer from a 6 hour safety margin to dump the slurry; long set times; low shear bond values; long cement lengths, and long wait on cement (WOC) times causing high expense.

Thus, there still exists a need in the art for improved methods, apparatus and products for abandoning wells.

There also exists a need in the art for improved methods, apparatus and products for plugging abandoned wells.

SUMMARY OF THE INVENTION

According to one embodiment of the present invention, there is provided an abandoned well comprising a well bore; a first component residing in the wellbore; and, a second component having a density greater than the density of the first component, and positioned residing in the wellbore at a point above the first component that will allow for gravity flow of the second component down into the first component. The first and second components are encapsulated components that upon contact with each other form a cementing plug.

According to even another embodiment of the present invention, there is provided a method of treating an abandoned well. The method includes providing a two component separately encapsulated cementing system, each component having a density greater than the density of any well fluid residing in the well. The method also includes selecting a first component and a second component from the group consisting of an A-list of components and a B-list of components, wherein the first component and the second component are different, and the density of the second component is higher than the density of the first component. The method even further includes placing the first component in the well. The method still further includes placing the second component in the well at a point above the first component that will allow for gravity flow of the second component down into contact with the first component.

According to still another embodiment of the present invention, there is provided a method of plugging an abandoned well. The method includes providing a two component separately encapsulated cementing system, each component having a density greater than the density of any well fluid residing in the well. The method also includes selecting a first component and a second component from the group consisting of an A-list of components and a B-list of components, wherein the first component and the second component are different, and the density of the second component is higher than the density of the first component. The method even further includes placing the first component in the well. The method still further includes placing the second component in the well at a point above the first component that will allow for gravity flow of the second component down into contact with the first component. The method yet further includes allowing the first and second components to gravity contact and form a cementing plug.

DETAILED DESCRIPTION OF THE INVENTION

The method of the present invention for plugging an abandoned well involves the use of a two part plugging composition, which is incorporated into known plugging methods.

The system of the present invention is a two-solid-component, pelletized system. The concept is to separate two or more materials that will mix together with water to form a settable mixture into two encapsulated masses. Neither of the masses will set alone. The encapsulated solids will not disassociate in water for sufficient time to allow them to be dumped into a well bore and fall to the bottom. Once there, the pellets will disassociate and react together with the water in the well to form a settable plug.

The present invention will utilize any of the known agglomeration and encapsulation technology to bind and coat powders into pellets that will perform as described.

In the present invention, the two powders are pelletized separately to withstand the trip down hole and then release to form a settable mix with water. The encapsulated material is protected from being wetted by well fluids and is of sufficient particle size and density to allow falling through clear well fluids at a rate of at least 1 foot/second. The encapsulation coating degrades with time and/or temp to release components.

The table below outlines several pairs sets of two solid components for use in the present invention. While the table is shown with components A and B paired, it is also possible to create pairs by picking one or more from A and one or more from B. Acidic or basic conditions are required for some of the reactions. It is possible to encapsulate NaOH adsorbed onto DE or a salt of an organic acid as a means of providing required pH.

| Component A | Component B |
| --- | --- |
| $Na_2SiO_3$ | $Ca(OH)_2$ |
| $Na_2SiO_3$ | AlOOH |
| $NaPO_3$ | $Ca(OH)_2$ |
| $CaHPO_4$ | $Ca(OH)_2$ |
| $CaHPO_4$ | $Ca(OH)_2$ + base |
| $Na_2SiO_3$ | silica + acid |
| Silica | $Ca(OH)_2$ + base |
| Silica | Alumina + base |
| $Al_2(HPO_4)_3$ | $Ca(OH)_2$ + base |
| $Na_2SiO_3$ | $NaAlO_2$ |
| MgO | $MgCl_2$ |

Examples of suitable compositions include Component 1–50% silica flour+15% $Ca(OH)_2$+15% $Na_2SiO_3$+20% PVA binder. Component 2–NaOH adsorbed onto DE 12% active.

In particular, the two part plugging composition of the present invention comprises one or more components selected from an A-list of components and one or more components selected from a B-list of components. Each component is separately encapsulated. In absence of the encapsulation the components will form a cementing plug.

The encapsulation on the encapsulated component is designed to degrade upon contact with the well fluid. The timing of the degradation can to tailored to fit the desired well operation. Generally, the first placed component will be allowed sufficient time to settle and degrade. The second placed component should be designed to be degraded by the time it is passing thru the first component.

In the present invention, the cementing system not only contains the components, but may optionally include additives to improve thermal stability, control set time, generate expansion, and control fluid loss. The additives may be incorporated into the system directly, or into one or both of the components.

While any cementing system may be utilized, it is desired that the system exhibit one or more, preferably several if not all, of the following characteristics: no shrinkage upon set up, maintains (or causes an increase in) the wellhole pressure; hydrophobic; density allows it to fall thru the well fluid at a suitable rate; and non-gas generating (so as not to cause micro channels).

In the present invention, accelerated set times are generally less than 12 hours, preferably less than 10 hours, more preferably less than 8 hours, even more preferably less than 6 hours, still more preferably less than 4 hours, and yet more preferably less than 2 hours.

The resulting cementing system may bond to the casing and or other formation surfaces in the well. The pipe may have coating of oil or water based drilling mud.

The method of the present invention for plugging abandoned wells, includes any of the known plugging methods in which is utilized the two component plugging composition as the cementing material. While a generalized plugging method is described below, it should be understood that any suitable plugging method as is known in the art, including any described above in the background or described in any cited reference (all of which are herein incorporated by reference), may be utilized with the plugging composition of the present invention.

Very commonly, the plug and abandonment method of the present invention will be carried out using one or more of the following steps. A bridge plug or cement plug is first run into the wellbore and set therein, typically by mechanical means whereby some sealing element extends radially outward to seal the annular area formed between the outside of the device and the casing wall. Thereafter, a perforating gun is lowered into the wellbore to a pre-determined depth and discharged to perforate the casing. The perforating gun is typically discharged by a firing head. The firing head used may be pressure actuated firing heads or mechanically actuated firing heads. After the perforations are made, the perforating gun may be retrieved. Thereafter, a cement retainer is lowered into the wellbore and set above the bridge plug. The cement retainer, like the bridge plug, acts as a packer to seal an annulus between the body of the cement retainer and the casing and isolate the area where the casing will be perforated. The components of the cementing composition of the present invention are then supplied into the cement retainer through a run-in string of tubulars attached thereto. Utilizing pressure, cement fills the isolated area of the wellbore and also extends through the perforations into the surrounding areas in the formation. After the cementing composition is squeezed, the run-in string is disengaged from the cement retainer. Cement is then typically deposited on the cement retainer as a final plug.

Generally in the practice of the method of the present invention, one of the components is selected as the first placed component and placed in the well at the desired plugging location, followed by placement of the other component as the second placed component in the well at a position above the first component, to allow the second component to gravity flow into the first component.

Any suitable apparatus and method for the delivery of the components may be utilized. As non-limiting examples, suitable delivery systems may utilize a dump bailer, coiled tubing and jointed tubing. They require a base to stack up against such as a packer, petal basket or sand plug. While any suitable delivery mechanism can be utilized, more specific non-limiting examples of suitable delivery mechanisms include: dump bailer run on electric line or slick line; pumping through tubing, drillpipe, work strings or any tubulars; allowing fall through fluids via gravity; and pumping into an annullas or pipe without displacing (i.e., "bull heading").

It is crucial that the first and second components have greater densities than the well fluid density. It is also crucial that the second placed component have a density greater than the first placed component so that the second placed component may displace the first component.

In some instances the selected first and second components will not have suitable densities, specifically, the densities of the first and second components may not be greater than that of the well fluid, or they may not have the suitable density for the order in which they are desired to be introduced into the well, or the densities may not have a suitable enough differential to achieve suitable displacement.

The present invention provides for the utilization of weighting agent additives to the first and second components to change the density of those components. Suitable additives to change the density include metal salts, preferably calcium chloride. Other examples of weighting agents include sand, barite, hemitite, calcium carbonate, FeO, MgO, and manganese ore. Sufficient amounts of the additive are utilized to achieve the desired density.

In the plugging method of the present invention first and second components are provided which have densities greater than the well fluid, with the component to be placed second having a greater density than the component to be placed first. Should the density of the first or second component need adjustment, a weighting agent as discussed above, will be added as necessary. The component with the greater density is then introduced into the well fluid at a position on top of sand/petal basket, the other component is then placed above the first placed component so that it may spontaneously gravity flow into contact the first placed fluid. The density difference will allow displacement of the first placed fluid by the second placed fluid and allow for in-situ mixing.

It should be appreciated that the rate of displacement and thus in-situ mixing will increase with increasing density differential between the first and second components, and decrease with decreasing density differential between the first and second components.

It should also be appreciated that at some point, the density differential between the first and second components is so low as to result in too slow of displacement.

On the other hand, it should further be appreciated that at some point, the density differential between the first and second components is so great as to result in too rapid of displacement so as to avoid much mixing.

Thus, the density differential should be selected so as to provide fast enough displacement for the plugging operation, and to facilitate sufficient in-situ mixing, and this differential can be determined on a case by case basis, for example by observation in clear container and trial and error.

Typical densities for the well fluid will be in the range of about 8.33 ppg up to about 20.0 ppg, with typical densities for the components in the range of about 8.33 ppg up to about 22.0 ppg.

It should be understood that other well fluid additives as are well known in the art may be incorporated into the first and/or second component, or added before, along with, or after the introduction of the first and/or second component, non-limiting examples of which include surfactants, surface bond enhancers (non-limiting examples include styrene butadiene latex, polyvinal alcohols, resins, other adhesives), emulsifiers, ph control agents, fluid loss additives, gas prevention additive, dispersants, expanding agents, and wetting agents.

Although the present invention has been illustrated by preferred reference to two component encapsulated systems, it should be understood that any plugging composition having two or more components can be encapsulated and utilized in the present invention.

All materials cited herein, including but not limited to any cited patents, publications, articles, books, journals, brochures, are herein incorporated by reference.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

What is claimed is:

1. A method of treating an abandoned well having a well fluid residing in the well, the method comprising:
   (A) providing an encapsulated component A and an encapsulated component B, wherein component A and component B will upon contact form into a cementing plug, and each having a density greater than the density of the well fluid;
   (B) selecting a first component and a second component from the group consisting of encapsulated component A and an encapsulated component B, wherein the first component and the second component are different, and the density of the second component is higher than the density of the first component;
   (C) placing the first component in the abandoned well;
   (D) placing the second component in the well at a point above the first component that will allow for gravity flow of the second component down into contact with the first component.

2. The method of claim 1, wherein steps (C) and (D) are carried out utilizing one or more of a dump bailer; pumping through tubing, drillpipe, work strings or tubulars; gravity flow; and bull heading.

3. The method of claim 1, wherein the first component is the encapsulated component A, and the second component is the encapsulated component B.

4. The method of claim 1, wherein the first component is the encapsulated component B, and the second component is the encapsulated component A.

5. The method of claim 1, wherein the well fluid density is in the range of about 8.33 ppg up to about 20.0 ppg, the encapsulated component A density is in the range of about 8.33 ppg up to about 22.0 ppg, and the encapsulated component B density is in the range of about 8.33 up to about 22.0 ppg.

6. The method of claim 1, wherein component A is selected from the group consisting of $Na_2SiO_3$, $NaPO_3$, $CaHPO_4$, Silica, $Al_2(HPO_4)_3$, and MgO, and wherein component B is selected from the group consisting of $Ca(OH)_2$, AlOOH, $Ca(OH)_2$+base, silica+acid, Alumina+base, $NaAlO_2$, and $MgCl_2$.

7. A method of plugging an abandoned well having a well fluid residing therein, the method comprising:
(A) providing an encapsulated component A and an encapsulated component B, wherein component A and component B will upon contact form into a cementing plug, and each having a density greater than the density of the well fluid;
(B) selecting a first component and a second component from the group consisting of encapsulated component A and an encapsulated component B, wherein the first component and the second component are different, and the density of the second component is higher than the density of the first component;
(C) placing the first component in the abandoned well;
(D) placing the second component in the well at a point above the first component that will allow for gravity flow of the second component down into contact with the first component; and
(E) allowing the first and second components to gravity contact and form a cementing plug.

8. The method of claim 7, wherein steps (C) and (D) are carried out utilizing one or more of a dump bailer; pumping through tubing, drillpipe, work strings or tubulars; gravity flow; and bull heading.

9. The method of claim 7, wherein the first component is the encapsulated component A, and the second component is the encapsulated component B.

10. The method of claim 7, wherein the first component is the encapsulated component B, and the second component is the encapsulated component A.

11. The method of claim 7, wherein the well fluid density is in the range of about 8.33 ppg up to about 20.0 ppg, the encapsulated component A density is in the range of about 8.33 ppg up to about 22.0 ppg, and the encapsulated component B density is in the range of about 8.33 up to about 22.0 ppg.

12. The method of claim 7, wherein component A is selected from the group consisting of $Na_2SiO_3$, $NaPO_3$, $CaHPO_4$, Silica, $Al_2(HPO_4)_3$, and MgO, and wherein component B is selected from the group consisting of $Ca(OH)_2$, AlOOH, $Ca(OH)_2$+base, silica+acid, Alumina+base, $NaAlO_2$, and $MgCl_2$.

13. An abandoned well comprising:
a well bore;
a first component residing in the well bore; and,
a second component having a density greater than the density of the first component, and residing in the wellbore at a point above the first component that will allow for gravity flow of the second component down into the first component, wherein the first component and a second component are selected from the group consisting of encapsulated component A and an encapsulated component B, wherein the first component and the second component are different, and the density of the second component is higher than the density of the first component.

14. An abandoned well comprising:
a well bore;
a first component residing in the well bore; and,
a second component having a density greater than the density of the first component, and contacting and gravity flowing thru the first component, wherein the first component and a second component are selected from the group consisting of encapsulated component A and an encapsulated component B, wherein the first component and the second component are different, and the density of the second component is higher than the density of the first component.

* * * * *